UNITED STATES PATENT OFFICE.

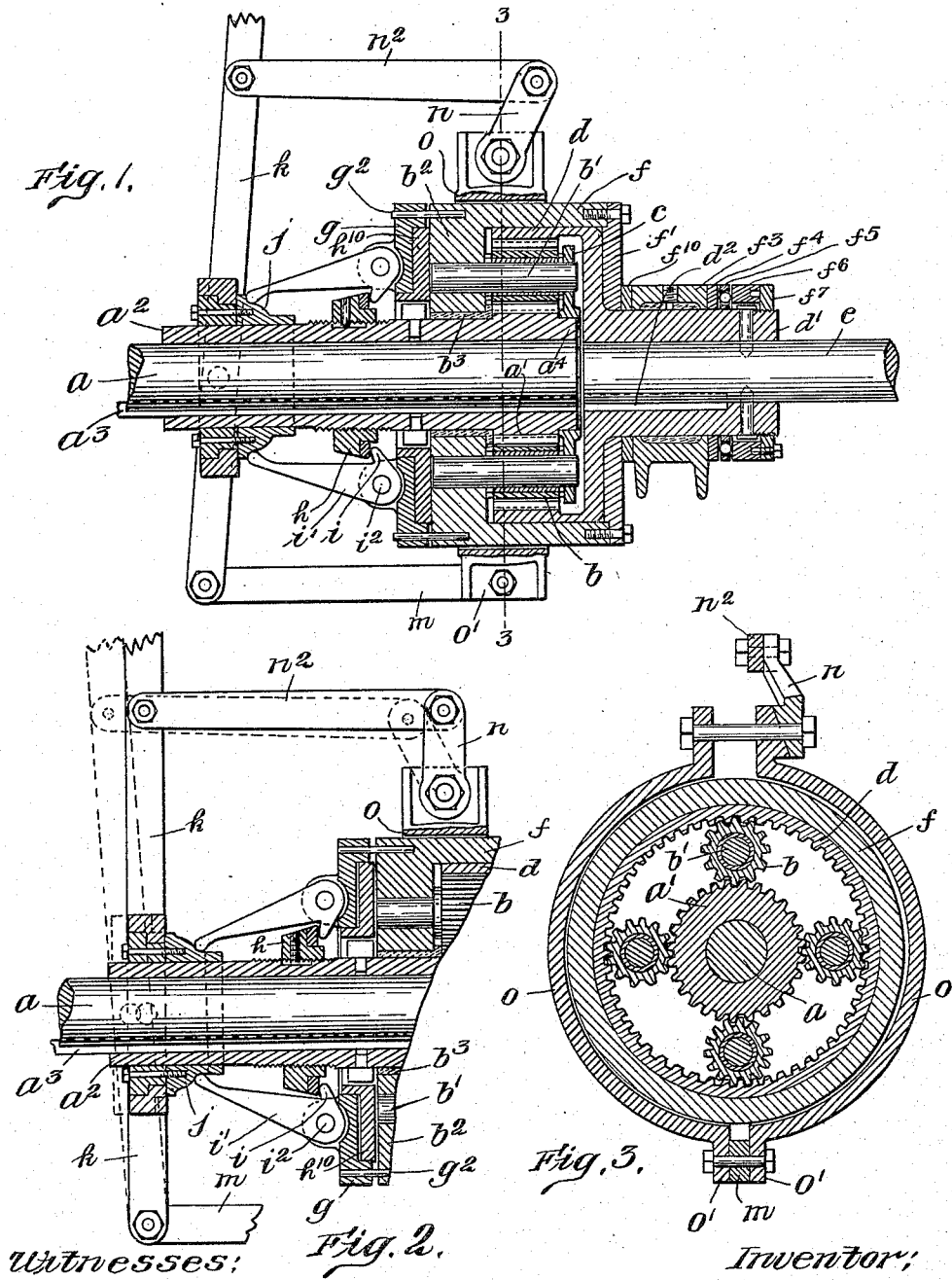

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

REVERSING-GEARING.

1,168,763.

Specification of Letters Patent.

Patented Jan. 18, 1916.

Application filed February 5, 1912. Serial No. 675,441.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reversing gearing of the planetary type involving a driving-shaft with spur-gear secured thereto, a driven-shaft with an internal gear secured thereto, pinions arranged between said spur-gear and internal gear which are borne by a rotatable carrier, and a clutch and a brake for said pinion-carrier.

Heretofore, so far as I am aware, the clutch has been arranged to connect the pinion-carrier with the driven-shaft, when it is designed to drive said driven-shaft by and in the same direction as the driving-shaft, and when the parts are thus arranged and connected the weight of the gearing is borne essentially by the driving-shaft.

The present invention has for its object to construct and arrange the several elements of a reversing gearing in such manner that the clutch connects the pinion-carrier with the driving-shaft when it is desired to drive the driven-shaft by and in the same direction as the driving-shaft, and the weight of the gearing is borne essentially by the driven-shaft. When using the reversing-gearing in connection with an engine arranged to drive a propeller, the engine-shaft becomes the driving-shaft of the reversing-gearing and the propeller-shaft becomes the driven-shaft thereof, and it is a decided advantage to remove the weight of the gearing from the rear bearing of the engine.

By this invention the clutch-operating means will be mounted on the driving-shaft, instead of on the driven-shaft, hence the hub of the internal gear may be made as long as desired, and a very substantial bearing provided for it which bearing is arranged close to the crown of the gear.

Figure 1 is a longitudinal vertical section of a reversing gearing embodying this invention, the parts being in position to connect the pinion-carrier with the driving-shaft, so that the driven-shaft will be rotated by and in the same direction as the driving-shaft. Fig. 2 is a similar sectional view of a portion of the reversing gearing, the parts being represented in full lines in position to permit the driving-shaft to rotate freely independent of the driven-shaft and in dotted lines in position to cause the driven-shaft to rotate in a direction opposite to the direction of rotation of the driving-shaft. Fig. 3 is a transverse vertical section taken on the dotted line 3—3, Fig. 1.

$a$ represents the driving-shaft, ordinarily called the engine-shaft, and $a'$ a spur-gear having at one side of it an elongated hub or sleeve $a^2$, which embraces the shaft $a$ and is secured thereto by a suitable key $a^3$, and having at the opposite side of it a short hub $a^4$.

$b$, $b$, represent the pinions, several of which are employed, which engage the spur-gear, and said pinions are mounted to rotate freely on studs $b'$, fixed to a pinion-carrier, which is here shown as a cylindrical case $f$, having an end wall $b^2$ to which the studs $b'$ are fixed, and having an end wall $f'$. The end wall $b^2$ is made of a substantial thickness and has its bearing on a bushing $b^3$, arranged on the hub or sleeve $a^2$ at one side of the spur-gear. At the opposite side of said spur-gear a plate $c$ is located, which is mounted on the short hub $a^4$ and affords bearings for the ends of the studs $b'$. The pinions $b$ also engage an internal or crown-gear $d$, having its hub $d'$ secured to the driven-shaft $e$, by a suitable key $d^2$. The internal or crown-gear is arranged within and fits loosely the cylindrical body of the pinion-carrier or case $f$, and the end wall $f'$ of said carrier extends over the crown of said gear. The driven-shaft is designed to be held against endwise movement in a direction toward the left, Fig. 1, or in other words the end-thrust in such direction is opposed, and, as here shown, the hub $d'$ of the internal gear which is arranged on said shaft extends through a bearing arranged in the frame $f^3$ and is additionally secured to said shaft by pins and at the outside of said frame $f^3$ said hub has arranged on it a washer $f^4$ engaging the frame, a ball-ring $f^5$, the balls borne by it engaging the washer, a sliding-collar $f^6$ also engaging said balls, and an adjustable collar $f^7$ engaging said sliding collar, the latter engaging a screw-threaded end-portion of the hub. The end wall $f'$ of the pinion-carrier or case which extends over the crown of said internal-gear occupies a position between said crown and the bearing-frame $f^3$, and is held against endwise movement by a washer $f^{10}$, interposed between said end wall and the frame, yet in lieu thereof other means may be employed for holding the internal gear and pinion-carrier from endwise movement and also for adjusting their relative position.

The pinion-carrier has a clutch to connect it with the driving-shaft when it is desired to rotate the driven-shaft by and in the same direction as the driving-shaft, and, as my present invention is not limited to the employment of any particular form of clutch, the clutch shown in Letters Patent #901,664, granted to me October 20, 1908, is here shown. This clutch is constructed as follows:—$h^{10}$ represents a clutch-plate slidably arranged on the sleeve $a^2$, but connected therewith so as to be rotated by it, and said clutch-plate is arranged immediately in front of the end wall $b^2$ of the pinion-carrier, so as to be movable into and out of engagement with said end wall. $g$ represents another clutch-plate, which overlies the clutch-plate $h^{10}$, and is slidably connected with the pinion-carrier by pins $g^2$ fixed to and projecting from said pinion-carrier. $h$ represents a collar which is secured to, but adjustably arranged on the sleeve $a^2$, and which is adapted to be engaged by and to serve as an abutment for the toes $i$, of levers $i'$, pivoted at $i^2$, to ears on the clutch-plate $g$, said levers extending in the general direction of the shaft $a$, and their outer ends engaging a cone $j$, mounted loosely on said sleeve $a^2$, and adapted to be moved along thereon by an actuating-lever $k$, pivotally connected at its lower end to an arm $m$. As said actuating-lever $k$ is moved on its pivot the cone will be slid along on the shaft, and the pivoted levers $i'$ thereby moved on their pivots to cause the clutch-plates to engage or disengage the pinion-carrier according to the direction said actuating-lever $k$ is moved.

When moved into the position shown in Fig. 1, the clutch engages the pinion-carrier and connects said pinion-carrier with the driving-shaft through the sleeve $a^2$, and as a result the driven-shaft is rotated by and in the same direction as the driving-shaft. When said actuating-lever is moved into the full line position shown in Fig. 2, the clutch is disengaged and the driving-shaft is free to rotate independently of the driven-shaft. The pinion-carrier is also supplied with a brake which is adapted to engage it, and hold it at rest when the clutch is disengaged, thereby to cause the driving-shaft to drive the driven shaft in a reverse direction. As my present invention does not involve any particular construction of brake, the brake of my aforesaid patent is here shown. It comprises essentially two semicircular members $o, o$, shaped to embrace the cylindrical body of the pinion-carrier, and having ears $o', o'$, at their lower ends which extend over the opposite sides of the arm $m$, and are secured thereto by a bolt, and having ears at their upper ends adapted to be engaged by a cam-lever $n$, by which the semicircular members are moved toward each other to engage the cylindrical body of the pinion-carrier, and said arm $n$ is connected by a link $n^2$ with the actuating-lever $k$, so as to be moved by said actuating-lever. When the actuating-lever is moved into the dotted line position, Fig. 2, and the arm $n$ is likewise moved into its dotted line position, the brake will be applied and the pinion-carrier held at rest and the object sought thereby attained.

I claim:—

In reversing-gearing, the combination of a driving-shaft and a driven-shaft, a sleeve secured to the driving-shaft, a spur-gear on said sleeve, pinions engaging said spur-gear, an internal gear surrounding the driving-shaft and engaging said pinions and having an elongated hub secured to the driven-shaft, a bearing frame through which said hub is extended, a carrier for the pinions, a clutch to connect the pinion-carrier with the sleeve on the driving-shaft, actuating-means for the clutch arranged on the sleeve bearing the spur-gear, and a brake arranged for arresting the pinion-carrier, substantially as described.

In testimony whereof, I have signed my name to this specification, in the presence of two subscribing witnesses.

HENRY A. TUTTLE.

Witnesses:
H. B. DAVIS,
B. J. NOYES.

Copies of this patent may be obtained for five cents each, by addressing the "Commissioner of Patents. Washington, D. C."